Jan. 14, 1969   E. E. SHELBY   3,421,779
HITCH DEVICE

Filed Oct. 25, 1966   Sheet 1 of 2

INVENTOR
EARL E. SHELBY
BY
R. Robert Henderson
ATTORNEY

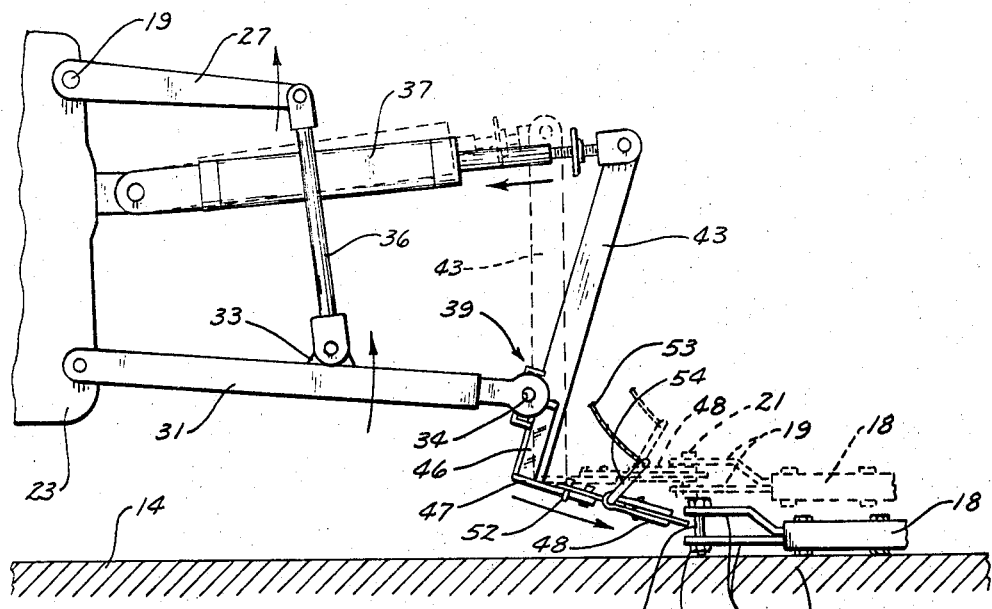
Fig. 3
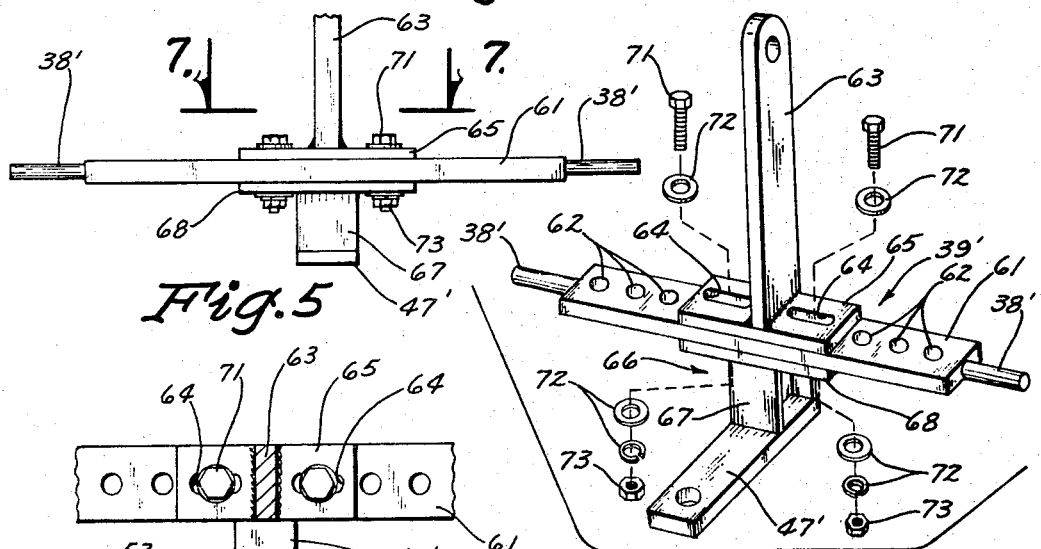
Fig. 5
Fig. 6
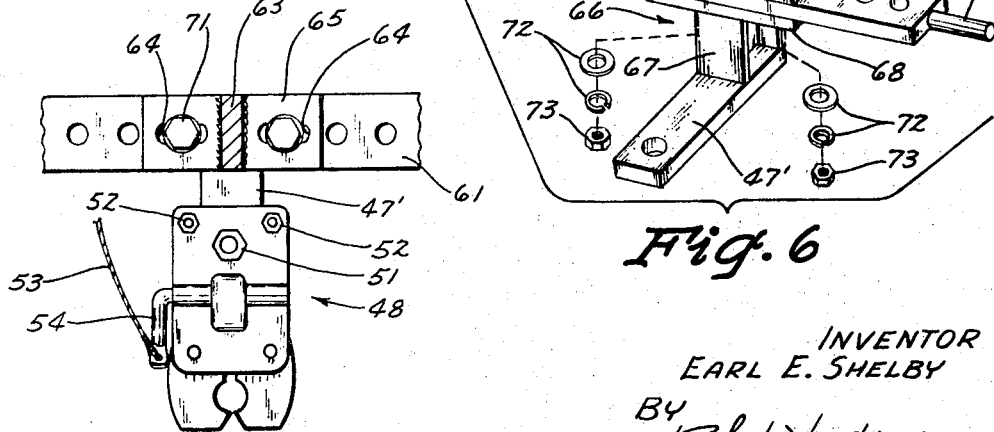
Fig. 7
INVENTOR
EARL E. SHELBY
BY
ATTORNEY

United States Patent Office 3,421,779
Patented Jan. 14, 1969

3,421,779
HITCH DEVICE
Earl E. Shelby, Silver City, Iowa 51571
Filed Oct. 25, 1966, Ser. No. 589,342
U.S. Cl. 280—479          4 Claims
Int. Cl. B60d 1/00

ABSTRACT OF THE DISCLOSURE

This invention relates to a hitch device for a tractor which, in cooperation with the lifting levers on the tractors, is adapted to engage the coupling of an implement to be towed by the tractor regardless of the disposition of the coupling when unconnected to the tractor. The hitch device comprises a drawbar rotatably mounted between rearwardly projecting arms pivotally connected to the tractor and to the levers, an elongated post secured to the drawbar which extends above the drawbar and depends below the drawbar, an adjustable means pivotally secured on one end to the tractor and on the other end to the free end of the upwardly projecting end of the post, and a rearwardly extending hitch means mounted on the free end of the depending end of the post, the hitch means being arcuately and vertically movable in response to movement of the adjustable means and the arms.

---

This invention relates generally to a tractor-implement coupler and in particular to a tractor-implement hitch device.

Various types of hitches and couplings have been devised for attaching an implement to a prime mover or tractor. However the difficulty of making the physical connection has not been fully overcome.

Implements are often stored in the open with the clevis or coupling of the implement lying on the ground with the result that many times the coupling becomes partially mired or covered by dirt and/or debris. In this event considerable effort is required to break the tongue loose to enable the hitch of the tractor to engage the coupling of the implement. Sometimes, when the ground is not level the coupling may rest behind a mound or a rock, as generally in the uncoupling of the implement the tongue is allowed to drop to the ground. In the event the coupling is disposed behind a mound of dirt or a rock the tongue must first be manually moved to allow the hitch to engage the coupling.

It is, therefore, an object of this invention to provide a hitch device which can be connected to the coupling of an implement regardless of the disposition of the coupling.

Another object of this invention is the provision of a hitch device which is controllable to reach down and literally scoop up the tongue of an implement.

Yet another object of this invention is the provision of a hitch device whereby the tongue of an implement can be positioned on the ground without dismounting from the tractor and without damaging the tongue by allowing it to drop to the ground.

A further object of this invention is the provision of a hitch device that is operable to connect to the coupling of hitch device of an implement which is partially buried in mud or debris or which is positioned behind a mound of dirt or a rock.

Still a further object of this invention is to provide a hitch device which can readily be attached to a tractor without requiring special skills on the part of the installer or special tools.

Still another object of this invention is the provision of a hitch device adapted to be mounted on the tractor using a three point hook up or on a tractor having a two point or fast hitch.

A still further object is to provide a hitch device capable of obtaining the above designated objects which is simple and rugged in structure, extremely economical to manufacture, and effective in operation.

These objects and other features and advantage of this invention will become more readily apparent upon reference to the following description, when taken in conjunction with the accompanying drawings, wherein:

FIG. 3 is a greatly enlarged fragmentary side elevational view of the structure shown in FIG. 1;

FIG. 5 is a fragmentary end view of a modified embodiment of the device;

FIG. 6 is a perspective view of the modified embodiment;

FIG. 7 is a top plan view of the modified embodiment taken along the line 7—7 in FIG. 5.

Figure 1:
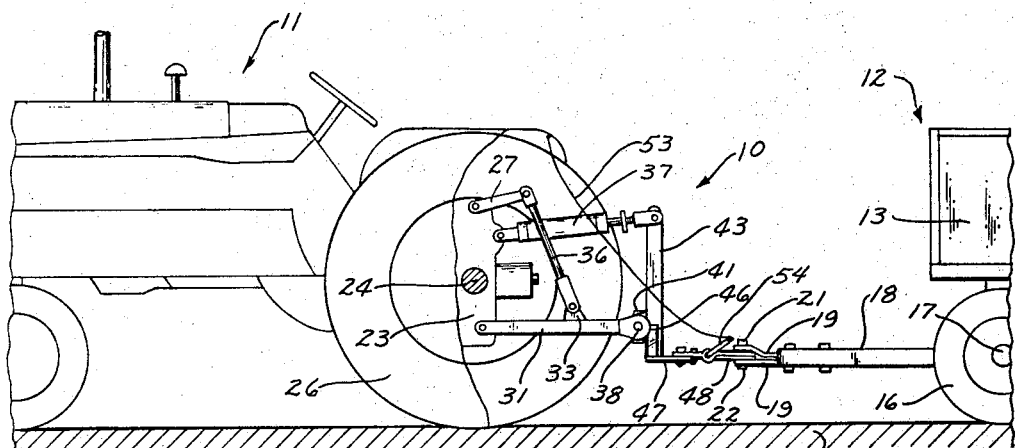
FIG. 1 is a fragmentary side elevational view of an implement connected to a tractor by the hitch device of this invention.

Referring now to the drawing, the hitch device of this invention, indicated generally at 10 in FIG. 1, is shown mounted on a conventional tractor 11, with an implement 12 releasably connected thereto.

The implement 12 (FIG. 1) includes a frame 13 supported above the ground 14 by at least one wheel 16 mounted on an axle 17. A forwardly extending tongue 18, attached to the implement 12, has a pair of vertically spaced forwardly extending plates 19 mounted thereon which serve as a clevis. A bolt or clevis pin 21 is inserted in aligned holes formed in the plates 19 and secured by a nut 22.

The tractor 11 (FIG. 2) includes a rear axle housing 23 containing a transverse axle 25, and a pair of laterally spaced, rearwardly extending controllable lifting levers 27 pivotally mounted on the housing 23. The lifting levers 27 are actuated by the hydraulic system of the tractor whereby the outer ends thereof are vertically movable.

Figure 2:
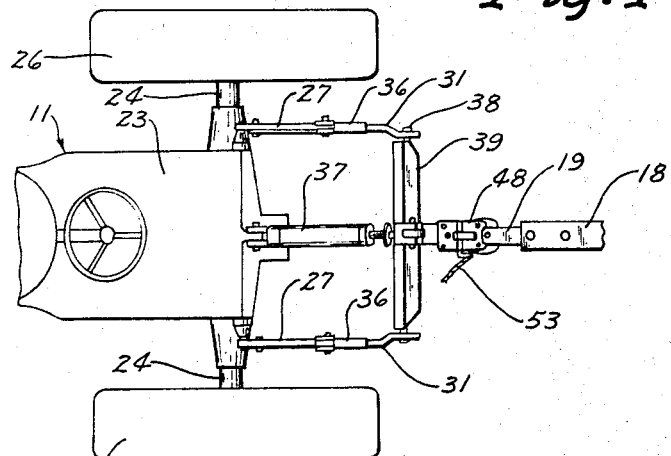
FIG. 2 is a fragmentary top plan view of the structure shown in FIG. 1.

Pivotally connected to the housing 23, below the levers 27 are a pair of laterally spaced rearwardly extending support arms 31 (FIGS. 1 and 2). Each arm 31 has an upstanding ear 33 formed thereon intermediate the ends thereof, and an opening 34 formed in the outer end thereof. A link 36 is attached between each ear 33 and the outer end of each lever 27, wherein vertical movement of the outer end of the levers 27 causes a corresponding movement in the outer ends of the arms 31.

As best shown in FIGS. 2 and 3, a rearwardly extending adjustable device 37, such as a manually operated turnbuckle or a hydraulic cylinder operatively connected to the hydraulic system of the tractor, is pivotally connected at the inner end to the housing 23 intermediate the levers 27 and arms 31.

Figure 4:
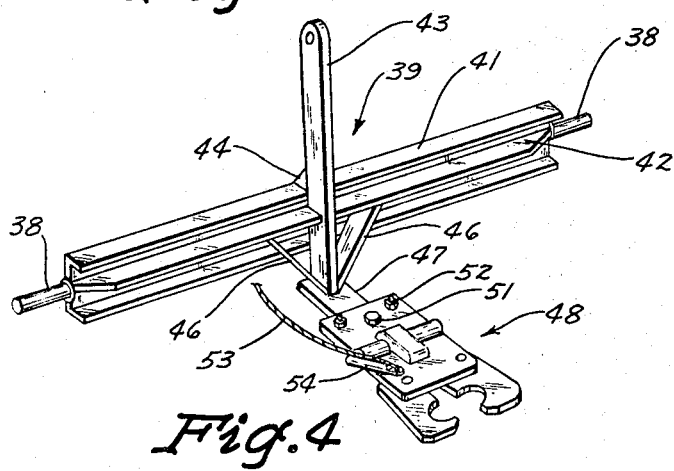
FIG. 4 is a perspective view of the hitch device.

The openings 34 (FIG. 3) in the outer end of the arms 31 are transversely aligned and rotatably receive outstanding pins 38 (FIG. 4) secured to opposite ends of a drawbar 39. The drawbar 39 is formed from a U-shaped member 41 having an elongated reinforcing bar 42 secured between the legs thereof, as by welding. Mounted on the drawbar 39 and transversely disposed relative to the longitudinal axis thereof is an elongated upstanding post 43 (FIG. 4). The upper end of the post 43 is pivotally connected to the outer free end of the device 37. The post 43 is rigidly supported by a brace 44 secured between one edge of the post and the upper leg of the member 41, and by a pair of struts 46, forming a V-brace, which are secured between the sides of the post 41 and the underside of the reinforcing bar 42.

A rearwardly extending plate 47. is mounted to the bottom of the post 43, as best shown in FIG. 4. A commercially available automatic self-locking hitch 48 is attached to the plate 47 by a bolt 51 and a U-clamp 52. The hitch 48 is manually releasable by a rope 53 having one end attached to the releasing lever 54 of the hitch and having the other end disposed within reaching distance of an operator mounted on the tractor, as shown in FIG. 1.

The procedure of hitching the tractor to the implement follows. The tractor is backed to a position wherein the end of the hitch 48 is directly over the clevis pin 21 on the tongue 18, as shown in dotted lines in FIG. 3. The adjusting device 37 is operated to move the post 43 from a vertical position, shown in dotted line view, to an inclined position, shown in full line view, thus causing the hitch 48 to swing downwardly in an arc. In the event the end of the hitch 48 is still disposed above the pin 21 the lifting levers 27 are lowered which in turn still further lowers the end of the hitch. The tractor is then backed toward the implement whereby the hitch slides between the plates 19 and engages the pin 21.

If an automatic self-locking hitch 48 as described and shown, wherein an automatic connection is achieved on contact is not used the hitch device 10 still achieves the object of reaching down and scooping up the tongue of the implement. In this event the clevis pin 21 must first be removed, the plate 47 positioned as described hereinabove, and the pin 21 then reinserted through the plates 19 and the plate 47 to accomplish the actual connection of the tongue to the hitch device 10.

To raise the tongue the adjusting device 37 is operated to return the post 43 to a vertical position and the lifting levers 27 are operated to lift the tongue to a horizontal position, as shown in FIG. 1.

It is apparent that even though the plates 19 are partially mired the coaction of the lifting levers 27 and the adjusting device 37 are operable to allow the hitch 48 to scoop down into the mire to connect with the pin 19. Furthermore if the open end of the plates 19 are situated behind a foreign object, such as a mound of earth or a rock, the hitch can reach behind the foreign object to engage the pin 21.

To disconnect the implement from the tractor a reverse procedure to that as outlined above is employed. The hitch is lowered to the ground by the lifting levers 27 and tilted by the adjusting device 37, if required by the upper surface of the ground. The rope 53 (FIG. 1) is pulled to open the jaws of the hitch 48 (FIG. 4) thus disengaging the hitch from the pin 21, or the pine 21 is removed if the hitch 48 is not employed.

A modified embodiment of the hitch device 10' is illustrated in FIGS. 5, 6 and 7. Those parts which are identical to the apparatus as described hereinbefore are identified by like reference numerals.

Many tractors utilizing the fast hitch or two point hitch are supplied with a drawbar 39' (FIG. 6) formed from an elongated bar 61 having a pair of outstanding pins 38' mounted on opposite ends thereof. These pins 38' are adapted to be secured between the outer ends of the lifting levers 31 of the tractor.

The drawbar 39' comprises a bar 61 having a plurality of spaced holes 62 formed therein adapted to receive the clevis pin of an implement. An inverted upstanding T-shaped post 63 having a pair of elongated slots 64 formed in the crossarm 65 thereof is secured to the top side of the bar, as described hereinafter. A second depending generally T-shaped post 66 is formed from an H-beam 67 and a crossarm 68 secured to the top of the beam as shown in FIG. 6.

The crossarm 68 has a pair of laterally spaced slots (not shown) formed therein wherein on mounting the crossarm 68 adjacent the bar 61 the lower slots are in alignment with the upper slots 64. Bolts 71, washers 72 and nuts 73, as shown in the exploded view of FIG. 6, secure the two crossarms 65 and 68 to opposite sides of the bar 61. A rearwardly extending plate 47' is secured, as by welding, to the bottom of the second post 66, and a self-locking automatic hitch 48 is secured thereto, as described hereinabove.

The operation of the modified embodiment of the hitch device 10' is identical to that described hereinabove.

In certain instances it is possible to accomplish the coupling of the implement to the tractor by utilizing only the drawbar 61, with the depending post 67 and the plate 47 attached thereto, connected to the support arms 31. Upon lowering the plate 47 to a position horizontally aligned between the clevis 19 of the tongue 18 and backing the tractor so as to engage the plate 47 between the clevis 19, the plate 47 will operate as a plow, or like device, thus passing through dirt and debris to engage the clevis 19.

Although a preferred and a modified embodiment of this invention has been disclosed hereinabove, it is to be remembered that various other modifications and alterations may be made thereto without departing from the true spirit and scope of the invention as defined in the appended claims.

I claim:
1. A hitch device adapted to be mounted on a tractor for connecting an implement thereto, the tractor having a pair of spaced, rearwardly projecting arms pivotally connected on an inner end to the tractor and a pair of controllable lifting levers interconnected between the tractor and the arms, the levers being operable to raise and lower the outer ends of the arms, the device comprising:

a drawbar rotatably connected at the ends thereof between the outer ends of the arms;

an elongated post fixedly secured to said drawbar centrally of said ends, said post having an upper portion the free end of which projects upwardly from said drawbar and a lower portion the free end of which depends from said drawbar;

adjustable means pivotally mounted at an inner end thereof to the tractor and pivotally connected at an outer end thereof to said upper portion free end, said adjustable means operable to move said post upper portion in a vertical plane toward the tractor and away from the tractor thus rotating said drawbar; and rearwardly extending hitch means mounted on one end to said lower portion free end; and operable to engage the tongue of the implement;

the free end of said hitch means being arcuately movable in response to movement of said adjustable means and vertically movable in response to movement of the arms.

2. A hitch device as defined in claim 1 wherein said upper portion and said lower portion are detachably mounted on said drawbar.

3. A hitch device as defined in claim 2 wherein said upper portion is detachably mounted on an upper side of said drawbar and said lower portion is detachably mounted on a lower side of said drawbar.

4. A hitch device as defined in claim 3 including a crossarm secured to the lower end of said upper portion and a crossbar secured to the upper end of said lower portion, said crossarm detachably mounted on said drawbar upper side and said crossbar detachably mounted on said drawbar lower side.

(References on following page)

References Cited

UNITED STATES PATENTS

| | | | |
|---|---|---|---|
| 2,321,516 | 6/1943 | Robertson | 172—248X |
| 2,496,474 | 2/1950 | Hyman | 280—479 |
| 2,531,768 | 11/1950 | Cline et al. | 172—248 |
| 2,996,127 | 8/1961 | Dunn | 172—275 |
| 3,347,564 | 10/1967 | Snoozy | 280—479 |

FOREIGN PATENTS

| | | |
|---|---|---|
| 801,020 | 9/1958 | Great Britain. |
| 869,820 | 6/1961 | Great Britain. |

LEO FRIAGLIA, *Primary Examiner.*

U.S. Cl. X.R.

280—461, 515; 172—248, 448